United States Patent [19]

Hayashi

[11] Patent Number: 4,868,434
[45] Date of Patent: Sep. 19, 1989

[54] DYNAMICALLY TUNED GYRO WITH UNITARY ROTOR ASSEMBLY

[75] Inventor: Sokichi Hayashi, Iida City, Japan

[73] Assignee: Tamagawa Seiki Kabushiki Kaisha, Tokyo, Japan

[21] Appl. No.: 213,724

[22] Filed: Jun. 30, 1988

[30] Foreign Application Priority Data

Jul. 23, 1987 [JP] Japan ................. 62-111962

[51] Int. Cl.⁴ ................. H02K 5/04; G01C 19/18
[52] U.S. Cl. ..................... 310/42; 29/598; 74/5.7; 310/266
[58] Field of Search ............... 74/5.6, 5.7, 5.8; 310/67 R, 42, 112, 114, 171, 268, 157, 261, 266; 29/598

[56] References Cited

U.S. PATENT DOCUMENTS

| | | | |
|---|---|---|---|
| 3,176,523 | 4/1965 | Amlie et al. | 74/5.6 |
| 3,264,880 | 8/1966 | Fischel | 74/5 |
| 4,326,428 | 4/1982 | Bostwick et al. | 74/5 |
| 4,380,108 | 4/1983 | Craig | 74/5.7 |
| 4,703,654 | 11/1987 | Ficken et al. | 74/5.7 |

FOREIGN PATENT DOCUMENTS 60-237313 11/1985 Japan .
62-129715 6/1987 Japan .
62-162618 10/1987 Japan .

*Primary Examiner*—Peter S. Wong
*Assistant Examiner*—D. L. Rebsch
*Attorney, Agent, or Firm*—Brooks Haidt Haffner & Delahunty

[57] ABSTRACT

A dynamically tuned gyro in which various components, such as the end cap having a hysteresis ring, the stator and the gyro rotor, can be assembled together when stacking them one upon the other only from the upper side of the rotary shaft, to facilitate the assembly operation and to improve the operational accuracy of the gyro.

5 Claims, 2 Drawing Sheets

DYNAMICALLY TUNED GYRO WITH UNITARY ROTOR ASSEMBLY

BACKGROUND OF THE INVENTION

1. Field of the Invention

This invention relates to a dynamically tuned gyro and more particularly to a dynamically tuned gyro in which various components of the gyro such as the end cap having a hysteresis ring, the stator and the gyro rotor can be assembled together by stacking them one upon the other only from the upper side of the rotary shaft.

2. Related Art Statement

As to the conventionally employed dynamically tuned gyros, there are so far proposed a variety of constructions, as typified by the construction shown in FIG. 4 of my Japanese laid open patent application 62-162618, published 16 October 1987, such construction also being shown in FIG. 1 of the accompanying drawings.

Referring now to FIG. 1, the numeral 1 denotes a casing having the shape in cross-section of an inverted letter U and on the inner wall 1a of the casing 1 there is fitted a frame 3 having a pair of ball bearings 2 at the central portion thereof.

A stator 4a having a stator winding 4 is stationarily provided at the inner wall 3a of the frame 3 and a rotor shaft 5 is mounted for rotation on an inner ring 2a of each of the bearings 2.

The frame 3 is secured to an outer ring 2b of each of the bearings 2. A substantially annular hysteresis ring 7 is provided at the outer periphery of a generally U-shaped end ring 6 secured to the lower end 5b of the rotary shaft 5 and to the inner ring 2a. The end cap 6 and the hysteresis ring 7 constitute a motor rotor 8, while the stator 4a and the motor rotor 8 constitute the spin motor 9.

At the upper part of the rotary shaft 5 a gyro rotor 13 is mounted through the medium of a gimbal 10 and a spring member 11. The gyro rotor 13 is a ring-like member having generally the shape of a letter U. On the inner wall of the gyro rotor 13 is secured a ring magnet 14.

On the lower end of the gyro rotor 13 a sensor ring 15 is provided and a sensor coil 16 is upstandingly mounted on the frame 3 in a facing relation to the sensor ring 15.

On the upper surface of the frame 3 a torque coil 17 is upstandingly mounted, uppermost part of which is located inside of the gyro rotor 13 in a facing relation to the ring magnet 14.

The above described dynamically tuned gyro operates in the following manner.

When the spin motor 9 is actuated in the state of FIG. 1, the rotary shaft 5 is revolved at a high speed for driving the gyro rotor 13 into rotation at high speed.

When a tilt is caused in the gyro rotor 13, this tilted state is sensed by the sensor coil 16, a corresponding control current is impressed across the torque coil 17, and a force of a magnitude proportionate to the product of the magnetic flux through the ring magnet 14 and the control current in the torque coil 17 acts on the gyro rotor 13 for controlling the posture of the gyro rotor 13 in a well-known manner.

In the above described dynamically tuned gyro, the following problems were presented.

Since the motor rotor 8 for the spin motor must be mounted below the lower bearing 2 of the rotary shaft 5, it is difficult to resort to an assembling method of stacking the components from the lower position component on, and the frame 3 has to be supported by, a jig, not shown.

As a result, the efficiency of the assembling operation cannot be improved since the motor rotor 8 which is a component of the spin motor must be attached to the rotary shaft 5 with the frame in the inverted position and the frame must be again brought to its normal position for assembling the gyro rotor. It is very difficult to assemble said gyro rotor.

SUMMARY OF THE INVENTION

In view of these drawbacks of the prior art device, it is a principal object of the present invention to provide a dynamically tuned gyro in which the end cap having a hysteresis ring, the stator and the gyro rotor can be assembled together by stacking them one upon the other only from one end of the rotary shaft.

The dynamically tuned gyro according to the present invention comprises a frame having a first bearing and a second bearing, a rotary shaft carried for rotation by said first and second bearings and extending upwards beyond said first bearing, a hysteresis ring having a U-shaped cross section, said hysteresis ring being provided at an inner ring of said first bearing and depending in the direction of said second bearing, a stator secured to said frame, a gyro rotor connected to the upper end of said rotary shaft through a hinge or gimbal unit, and a torque coil provided in a facing relation to said gyro rotor.

In the dynamically tuned gyro of the present invention, various gyro components, such as the hysteresis ring, the stator and the gyro rotor, can be assembled upon stacking them one upon the other only from one end or the upper end of the rotary shaft, while no component parts need be attached to the rotary shaft from the lower end of the rotary shaft. Since no component parts need be attached to the portion of the rotary shaft below the second bearing, the various gyro components such as the hysteresis ring, stator and the gyro rotor can be stacked one upon the other, with the frame resting on the worktable. The result is that the efficiency of the assembling operation can be enhanced with improvement in the operational accuracy and reduction in manufacturing costs.

EMBODIMENT OF THE INVENTION

Figure 1:
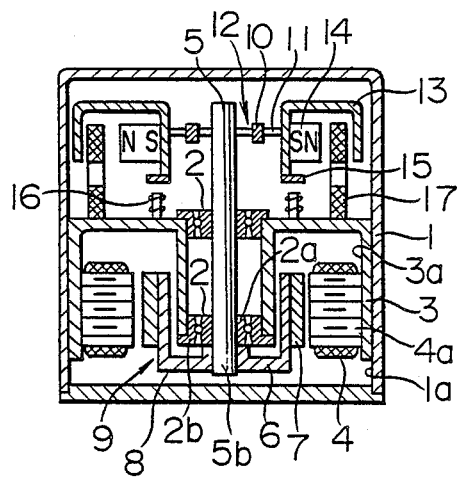
FIG. 1 is a longitudinal cross section of a conventional dynamically tuned gyro.

A preferred embodiment of the dynamically tuned gyro according to the present invention will be hereafter explained by referring to the accompanying drawings, in which parts or components same as or similar to those of the FIG. 1 device are indicated by the same reference numerals.

FIGS. 2 to 5 show a dynamically tuned gyro according to the present invention. In these figures, the numeral 1 denotes a casing having generally the shape of an inverted letter U and a cylindrical upstanding section 1c is formed integrally with the central portion of a frame 1b provided at the lower part of the casing 1. A pair of ball bearings, that is, a first ball bearing 2 and a second ball bearing 2c, are mounted within the interior of the upstanding section 1c.

On the inner wall of the frame 1b there is secured a stator 4a having a stator winding 4. The outer rings 2b of the bearings 2 and 2c are secured to the upstanding section 1c, and a rotary shaft 5 is provided at the inner rings 2a of the bearings 2 and 2c. On a sensor coil attachment plate 16a secured to the upper surface of the stator 4a there is provided a sensor coil 16 in a facing relation to the sensor coil ring 15. Plate 16a can be secured to stator 4 by an adhesive.

On the upper surface of the inner ring 2a of the first bearing 2, there is integrally formed a hysteresis ring 7 having a substantially U-shaped and rotated in unison with the rotary shaft 5. The lower end of the hysteresis ring 7 extends a cylinder towards said second bearing 2c.

The stator 4a and the hysteresis ring 7 constitute a spin motor 9 for rotating the rotary shaft 5.

At the upper portion of the rotary shaft 5 there is mounted a gyro rotor 13 by the intermediary of a hinge unit 12 composed of a gimbal 10 and a spring member 11, said gyro rotor 13 being formed by a ring-shaped member having a substantially U-shaped cross section. On the inner wall of the gyro rotor 13 there is secured a ring magnet 14.

Hence, in contradistinction from the prior art system, no component parts are attached to the rotary shaft 5 at a position below the second bearing 2c.

Figure 4:
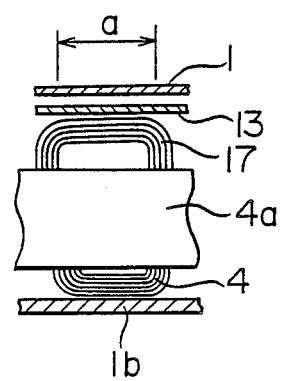
FIG. 4 is a cross section taken along line B—B of FIG. 2.

On the upper end of the stator winding 4, a torque coil 17 is provided protrudes in the form of a letter U, as shown in FIG. 4. This torque coil 17 may be used simultaneously as the drive windings for the spin motor 9 and the torque motor 18.

Thus, the high frequency signals for driving the spin motor and the dc current for driving the torque motor 18 are applied simultaneously to the same winding formed by the stator winding 4 and the torque coil 17.

Figure 5:
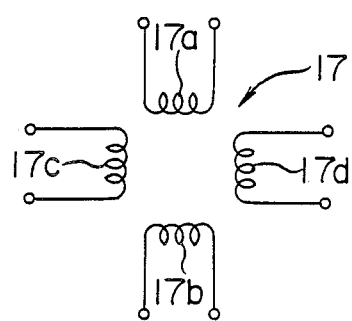
FIG. 5 shows an equivalent circuit of the stator winding.

The stator winding 4 and the torque coil 17 are arranged in a four-pole configuration, as shown in FIG. 5. In the case of the torque motor 18, the current is caused to flow through the torque coil 17 located in the magnetic field provided by the gyro rotor 13 and the ring magnet 14 and in a direction orthogonal to the magnetic field. Thus, when the dc current is caused to flow from outside through a set of windings 17a, 17b and a set of windings 17c, 17d of the torque coil 17 in FIG. 5, a force proportionate to the current supplied from outside, i.e. the torque, is produced across both ends of the gyro rotor 13.

The stator 4a is used as the stator for the spin motor 9 and as the stator for the torque motor 18.

The above described dynamically tuned gyro according to the present invention operates in the following manner.

The hysteresis ring 7 is placed and attached to the first bearing 2 of the frame 1b. The stator 4a having the stator winding 4 and the gyro rotor 13 having the hinge unit 12 are then attached in position to complete the assembling.

Figure 2:
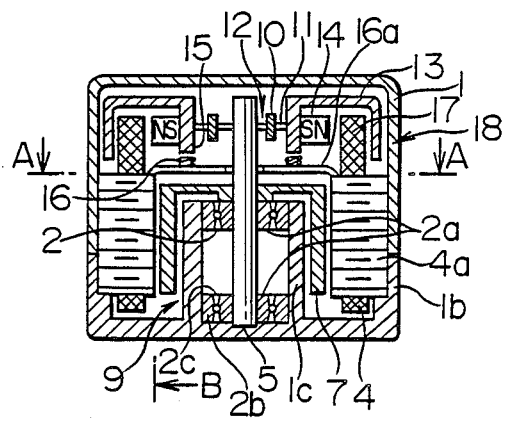
FIG. 2 is a longitudinal cross section of a dynamically tuned gyro according to the present invention.
Figure 3:
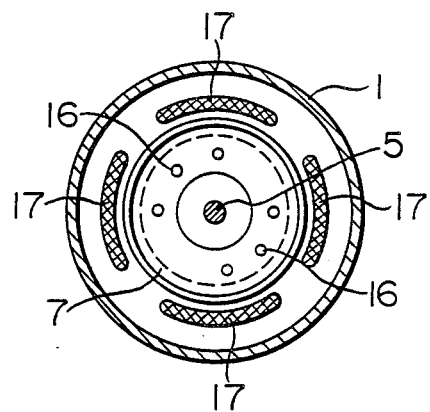
FIG. 3 is a cross section taken along line A—A of FIG. 2.

It is to be noted that, although the above description has been made of the arrangement in which the stator winding 4 and the torque coil 17 shown in FIG. 2 are used as one winding, the present invention may also be applied to an arrangement in which the winding 4 and the torque coil 17 are used as the independent windings respectively as in the conventional device with the same operation and results.

What is claimed is:

1. A dynamically tuned gyro comprising:
    a frame with a base and a tubular portion extending from said base in a predetermined direction, said tubular portion being spaced, at its periphery, from the periphery of said base;
    a first bearing and a second bearing mounted within said tubular portion and spaced from each other in said direction, said first bearing being disposed further from said base than said second bearing;
    a shaft mounted on said first bearing and said second bearing for rotation with respect to said frame and having a portion extending in said direction and outwardly of said first bearing;
    a hysteresis ring insertable over said portion of said shaft mounted on said shaft for rotating said shaft, said ring being U-shaped in cross-section to provide a transverse wall extending substantially perpendicular to the axis of said shaft and a depending wall extending substantially parallel to said axis, said transverse wall being connected to said shaft at said first bearing and said depending wall extending from said transverse wall in the direction opposite to the first-mentioned said direction and encircling said tubular portion and at least said first bearing;
    a stator with at least one coil mounted on said frame adjacent said ring for rotating said ring and said shaft, said stator being disposed radially outward of said ring and insertable into its position in the direction opposite from the first-mentioned said direction;
    a gyro rotor mounted on said portion of said shaft by means of a gimbal unit for rotation with said shaft, said gimbal unit permitting tilting of said gyro rotor with respect to the axis of said shaft;
    sensor coils mounted from said frame adjacent said gyro rotor and insertable into their positions in the direction opposite from the first-mentioned said direction;
    torque means including windings adjacent said gyro rotor for modifying the tilting of said gyro rotor;
    each of the components comprising said bearings, said shaft, said hysteresis ring, said stator, said sensor coils and said gyro rotor being individually insertable into their respective positions in the same direction with respect to said base whereby said components may be assembled with said base in a fixed position; and
    a casing which has an inverted U-shaped cross-section, said casing having a free end engageable with said frame and said casing with said frame providing an enclosure for said components.

2. A dynamically tuned gyro as set forth in claim 1 wherein said sensor coils are mounted on a plate the periphery of which engages said stator and which is intermediate said hysteresis ring and said gyro rotor, said plate having a central opening for the passage of said shaft and being insertable into engagement with said stator in the direction opposite to the first-mentioned said direction.

3. A dynamically tuned gyro as set forth in claim 1 wherein said frame has an integral peripheral wall extending in the first-mentioned said direction and engaging said stator and said free end of said casing, said peripheral wall being spaced from said tubular portion and encircling said second bearing and at least portions of said stator and said hysteresis ring.

4. A dynamically tuned gyro as set forth in claim 1 wherein said windings are an extension of said coil of said stator which extend from said stator to adjacent said gyro rotor.

5. A dynamically tuned gyro as set forth in claim 4 wherein said gyro rotor has an outer wall extending toward said first one of said bearings and wherein said extension of said coil is disposed intermediate said outer wall and said portion of said shaft.

* * * * *